Feb. 17, 1931. T. W. FAWELL 1,792,971
PICTURE PROJECTING APPARATUS
Filed Oct. 29, 1928   3 Sheets-Sheet 1
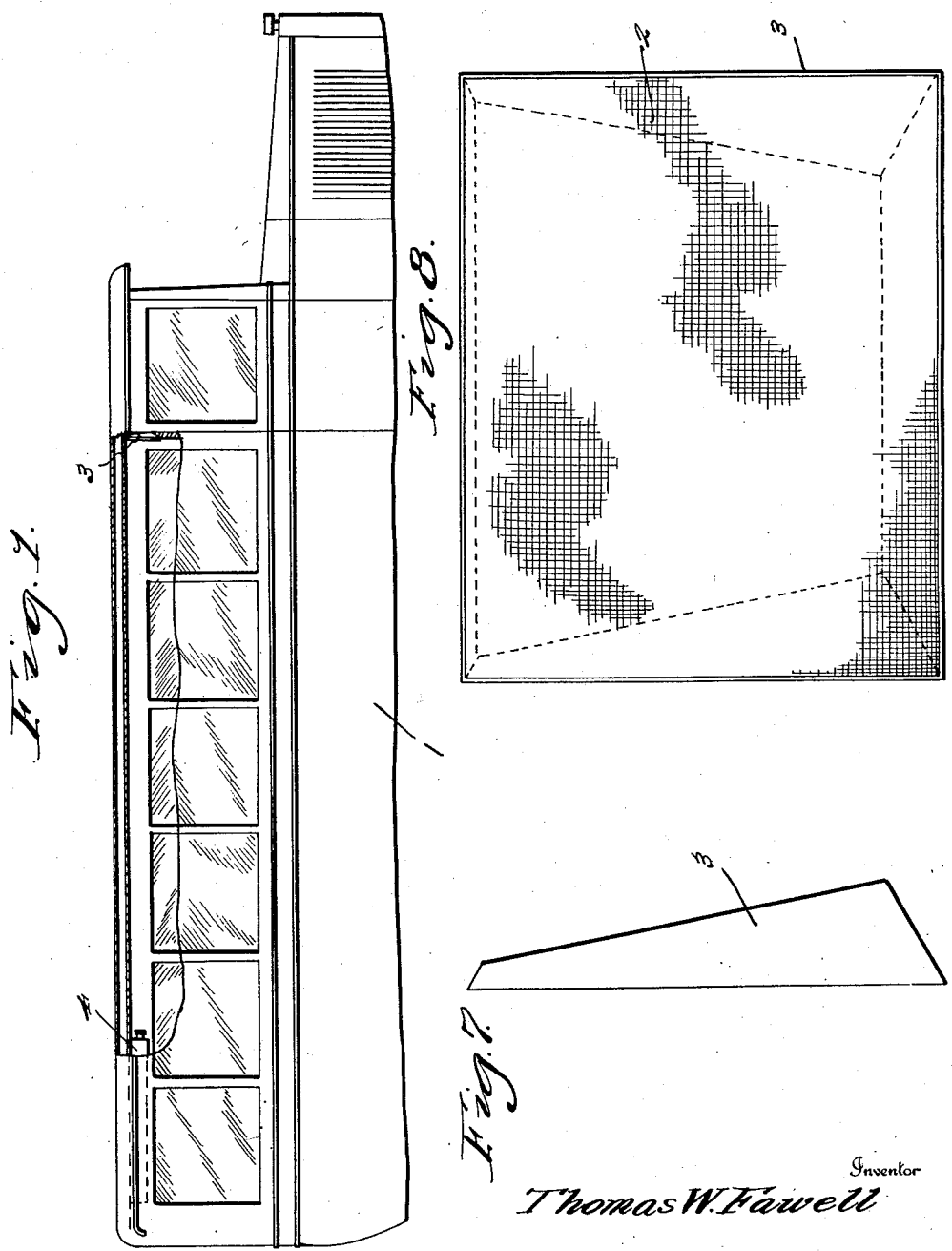

Feb. 17, 1931.                T. W. FAWELL                 1,792,971
                         PICTURE PROJECTING APPARATUS
                           Filed Oct. 29, 1928          3 Sheets-Sheet 2
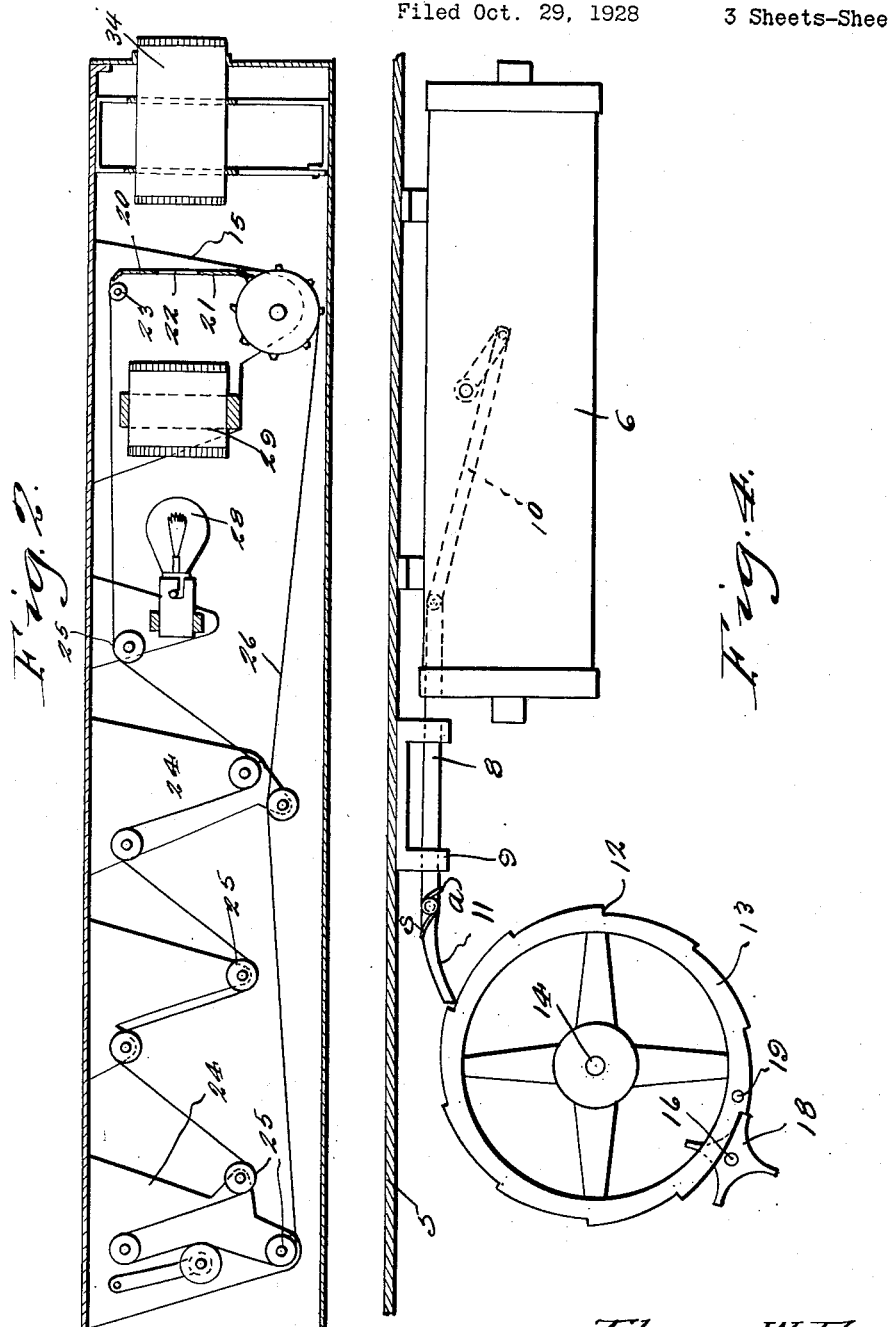

Feb. 17, 1931.  T. W. FAWELL  1,792,971
PICTURE PROJECTING APPARATUS
Filed Oct. 29, 1928  3 Sheets-Sheet 3
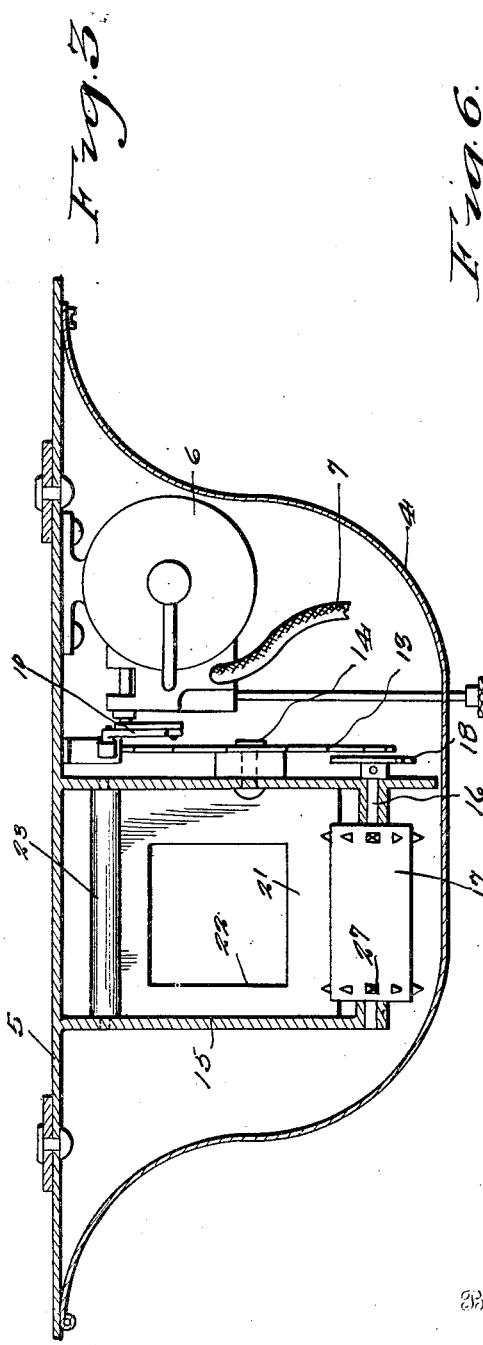
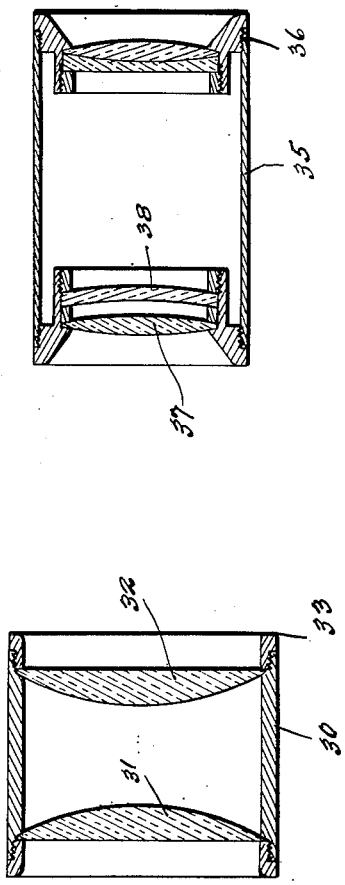
Inventor
Thomas W. Fawell
By Clarence A. O'Brien
Attorney Patented Feb. 17, 1931

1,792,971

UNITED STATES PATENT OFFICE

THOMAS WILLIAM FAWELL, OF CHICAGO, ILLINOIS

PICTURE-PROJECTING APPARATUS

Application filed October 29, 1928. Serial No. 315,821.

The present invention relates to improvements in picture projecting apparatus and has for its principal object to provide an apparatus that is adapted to be used for advertising purposes.

In order that the advertised matter may reach a large number of people, the apparatus may be mounted desirably in a motor truck or other vehicle body.

A further and important object is to provide a picture projecting apparatus which includes a screen that is preferably mounted in the front end portion of the vehicle body, the projection apparatus being located in the rear portion of the vehicle body for projecting the pictures or images upon the screen so that the same may be easily and readily viewed by the occupants of the vehicle, the parts being arranged in such a manner that the projection of the pictures upon the screen will not be interfered with by persons entering or leaving the bus.

A further and important object is to provide a picture projecting apparatus of the above mentioned character which includes a suction motor for operating a pawl and ratchet mechanism which in turn is provided for feeding the endless belt that constitutes the film over suitable guide pulleys and in front of the projection mechanism.

Still a further object is to provide a picture projecting apparatus of the above mentioned character which will at all times be positive and efficient in its operation, the same being further simple in construction, inexpensive, strong and durable and further well adapted to the purpose for which it is designed.

Other objects and advantages of the invention will become apparent during the course of the following description when taken in connection with the accompanying drawings.

In the accompanying drawings wherein like reference characters indicate corresponding parts throughout the same:

Figure 1 is a fragmentary elevational view of a motor vehicle bus showing parts of my improved picture projecting apparatus arranged therein.

Figure 2 is a longitudinal sectional view through the elongated casing within which is housed the picture projection mechanism and illustrating the manner in which the endless film is trained over the guide pulleys.

Figure 3 is a vertical sectional view through the casing for more clearly disclosing the manner in which the suction motor is operatively connected with the feeding mechanism for the endless film.

Figure 4 is a side elevation of the suction motor showing the sliding reciprocating arm that is operatively connected with the motor and which arm drives a ratchet wheel, there being shown also in this figure the laterally extending pin that is carried by the ratchet wheel for cooperation with a star wheel.

Figure 5 is a sectional view through the condenser unit.

Figure 6 is a similar section through the projecting lenses.

Figure 7 is a side elevation of the housing for the screen, and

Figure 8 is a front elevation thereof showing the screen.

In the drawings wherein for the purpose of illustration is shown the preferred embodiment of my invention, the numeral 1 designates the body of a motor vehicle bus that is used for conveying passengers, the seating arrangement within the bus not being shown as the same is of the conventional construction.

A substantially rectangular shaped screen 2 that is arranged within a suitable housing 3 is supported in the forward end portion of the bus directly below the ceiling or top thereof as clearly illustrated in Figure 1.

The picture projecting apparatus includes the provision of the elongated casing 4 that is secured to the interior of the top of the bus at the rear end thereof, this casing being open at its top and a cover 5 is provided therefor.

Secured within the casing 4 adjacent one side thereof is an air suction motor denoted generally by the reference character 6, and this motor may be of any conventional construction such as is used for operating a windshield wiper. The suction hose that leads to the motor for operating the same is illustrated at 7. Air for driving the motor may be supplied thereto through the hose 7 from any suitable source.

The motor is operatively connected to one end of an elongated arm 8 that is arranged for slidable movement within a suitable hanger 9, through the connecting elements 10. The other end of the arm 8 has pivotally connected thereto, as at $a$ slightly curved pawl 11 that cooperates with the ratchet teeth 12 formed in the peripheral edge of the ratchet wheel 13 that is supported on a stub shaft 14. A spring $f$ is suitably associated with the pivot $a$, and has one end engaging the adjacent end of the arm 8, and the other end of the spring engaging the dog 11 for normally urging the dog downwardly into engagement with the ratchet wheel. This stub shaft extends from one side of a hanger unit 15 also arranged for disposition within the casing 4, and being located adjacent the forward end of the casing.

A shaft 16 is journaled for rotation through the sides of the hanger unit 15 at the lower end thereof, and arranged on this shaft for disposition between the sides of the hanger unit is the sprocket pulley 17 over which the endless film belt is trained in the manner to be presently described. A star wheel 18 is secured on one end of the shaft 16 and cooperating with this star wheel is the laterally extending pin 19 carried by the sprocket wheel 13, and this pin 19 periodically engages with the star wheel 18 in the manner also to be presently described.

Arranged between the sides of the hanger unit 15 is the vertically disposed aperture plate 21, the opening in said plate through which the light passes, being shown at 22. A guide roller 23 is also arranged between the sides of the hanger unit 15 adjacent the top thereof and as is clearly shown in Figure 2, this guide roller is located adjacent the upper edge of the aperture plate 21.

A series of hanger units denoted generally by the reference character 24 are arranged in the rear portion of the casing at spaced intervals, and suitable guide rollers 25 are associated transversely with respect to the hanger units 25 in the staggered relation so that the endless film 26 that is trained over these guide rollers will also assume a staggered course. The film is adapted to extend across the front face of the aperture plate 21 and the opening 22 formed therein and the teeth 24 of the sprocket pulley 17 have threaded engagement with the usual openings formed in the edge portion of the film 26 as suggested in Figure 2.

A projecting lamp 28 is supported in one of the hanger units rearwardly of the aperture plate 21 and interposed between the aperture plate 21 and projecting lamp 28 is a condenser unit 29 which unit comprises a cylindrical body 30. A pair of lenses 31 and 32 are secured in the respective ends of the cylindrical body 30 with the convex faces of the lenses arranged in opposed relation. Threaded rings 33 are associated with the internally threaded ends of the cylindrical body for securing the lenses in position as also shown in Figure 5.

The lenses 31 and 32 are disposed in the path of the light rays from the lamp 28.

Supported in the forward end of the elongated casing 4 is a lens carrying unit 34 that has one end thereof projecting through an opening formed in the forward end of the casing. This unit 34 also includes a cylindrical body 35 and has the lens retaining rings 36 detachably secured in the respective ends thereof, each of said lens retaining rings carrying a pair of lenses 37 and 38, and it will be observed upon referring to Figure 6 that the lenses associated with the rearmost ring 36 are spaced with respect to each other, whereas the lenses associated with the forwardmost rings are disposed in abutting relation. These lenses are also so positioned as to be within the path of the light rays projected from the lamp 28.

The endless film may have any suitable advertising matter printed thereon, and the operation of my improved projecting apparatus is thought to be readily obvious from the construction shown and described. The pictures or images will be projected onto the screen 2 in such a manner that the occupants of the bus can view the display of the advertising matter on the screen, while occupying their seats in the bus, and by arranging the projecting apparatus in the manner as shown and described, the projection of the pictures or images upon the screen will not be interfered with by persons entering or leaving their seats in the bus.

While the apparatus has been shown as being particularly adapted to be used in a motor vehicle bus, it is to be understood that the mechanism can also equally as well be used in windows, as well as any other desirable place where short range automatic projections are desirable.

The simplicity of my construction enables the parts to be readily and easily assembled or disassembled, and furthermore the apparatus can be operated at a very low cost, and the same will at all times be positive and efficient in its operation.

While I have shown the preferred embodiment of my invention it is to be understood that minor changes in the size, shape and arrangement of parts may be resorted to without departing from the spirit of the invention and the scope of the appended claims.

Having thus described the invention, what I claim as new and desire to secure by Letters Patent is:

1. A picture projecting apparatus of the class described comprising in combination, a film, an aperture plate over which the film is adapted to pass, a projection apparatus arranged rearwardly of the aperture plate, a sprocket pulley adjacent the aperture plate for feeding the film thereacross, a shaft on which said pulley is mounted, a star wheel secured on one end of the shaft, a ratchet wheel mounted for rotation adjacent the aperture plate, a pin extending laterally from the ratchet wheel for cooperation at periodic intervals with the star wheel to actuate the shaft and the sprocket pulley secured thereon, means for actuating the ratchet wheel, said means comprising an arm, a hanger in which said arm is slidable, one end of the arm being bent to form a pawl for engagement with the teeth in the ratchet wheel, the other end of the arm being connected with an operating mechanism.

2. A picture projecting apparatus of the class described comprising in combination, a film, an apertured plate over which the film is adapted to pass, a projection apparatus arranged rearwardly of the apertured plate, a sprocket pulley adjacent the apertured plate for feeding the film thereacross, a shaft on which said pulley is mounted, a star wheel secured on one end of the shaft, a ratchet wheel mounted for rotation adjacent the apertured plate, a pin extending laterally from the ratchet wheel for cooperation at periodic intervals with the star wheel to actuate the shaft and the sprocket pulley secured thereon, a motor, an arm, means operatively connecting the motor with said arm, an operating connection between the arm and the teeth of said ratchet wheel for imparting intermittent rotation to said ratchet wheel.

3. A picture projecting apparatus of the class described comprising in combination, a film, an apertured plate over which the film is adapted to pass, a projection apparatus arranged rearwardly of the apertured plate, a sprocket pulley adjacent the apertured plate for feeding the film thereacross, a shaft on which said pulley is mounted, a star wheel secured on one end of the shaft, a ratchet wheel, means for rotatably supporting the ratchet wheel adjacent the apertured plate, a pin extending laterally from the ratchet wheel for cooperation at periodic intervals with the star wheel to actuate the shaft and the sprocket pulley secured thereon, means for actuating the ratchet wheel, said last mentioned means including a motor, an arm operatively connected with said motor, means on the free end of said arm adapted for successive engagement with the teeth of the ratchet wheel for imparting intermittent rotation thereto.

4. In a projecting apparatus of the class described, the combination of a screen, means for projecting images on the screen, said projecting means including a film, a feeding mechanism therefor, said feeding mechanism including a shaft, a sprocket pulley on the shaft for rotation therewith, a star wheel secured on one end of the shaft, a rotatable ratchet wheel supported adjacent said shaft, a pin extending laterally from the ratchet wheel for periodic engagement with the star wheel to actuate the shaft, an arm, a hanger in which said arm is slidable, spring pressed dog pivotally mounted on one end of said arm, for successive engagement with the teeth of the ratchet wheel imparting step by step rotation to said ratchet wheel, and means for actuating said arm.

5. In a projecting apparatus of the class described, the combination of a screen, means for projecting images on the screen and including, a film, feeding mechanism therefor, said feeding mechanism including a shaft, a sprocket pulley on the shaft for rotation therewith, a star wheel secured on one end of the shaft, a rotatable ratchet wheel supported adjacent said shaft, a pin extending laterally from the ratchet wheel for periodic engagement with the star wheel to actuate the shaft, a slidable arm, means for slidably supporting said arm in operative relation to said ratchet wheel, means at one end of said arm yieldably engaging the ratchet wheel for successive engagement with the teeth of said ratchet wheel, actuating means having operative connection with the other end of said arm for imparting movement to said arm, and said film being in the form of an endless belt, and guide pulleys over which said endless film is trained.

In testimony whereof I affix my signature.

THOMAS WILLIAM FAWELL.